United States Patent [19]

Reischl

[11] Patent Number: 4,820,415

[45] Date of Patent: Apr. 11, 1989

[54] POLYMER CARRIER MASSES AS CARRIERS IN BIOCHEMICAL CONVERSION PROCESSES IN THE AQUEOUS PHASE

[75] Inventor: Artur Reischl, Höchenschwand, Fed. Rep. of Germany

[73] Assignee: Bayer Aktiengesellschaft, Leverkusen, Fed. Rep. of Germany

[21] Appl. No.: 40,912

[22] Filed: Apr. 21, 1987

[30] Foreign Application Priority Data

May 3, 1986 [DE] Fed. Rep. of Germany ....... 3615103

[51] Int. Cl.$^4$ ................................................ C02F 3/08
[52] U.S. Cl. ..................................... 210/616; 210/603
[58] Field of Search ............... 210/616, 617, 150, 151, 210/618, 603; 435/262, 167

[56] References Cited

U.S. PATENT DOCUMENTS

| | | | |
|---|---|---|---|
| 4,256,573 | 3/1981 | Shimodaira et al. | 210/618 |
| 4,415,454 | 11/1983 | Fuchs | 210/616 |
| 4,419,243 | 12/1983 | Atkinson et al. | 210/618 |
| 4,521,311 | 6/1985 | Fuchs et al. | 210/618 |
| 4,576,718 | 3/1986 | Reischl et al. | 210/616 |
| 4,608,397 | 8/1986 | Reischl | 521/101 |

FOREIGN PATENT DOCUMENTS

| | | | |
|---|---|---|---|
| 3123155 | 1/1983 | Fed. Rep. of Germany | 210/616 |
| 3402696 | 8/1985 | Fed. Rep. of Germany | . |
| 3526185 | 2/1987 | Fed. Rep. of Germany | . |
| 3526184 | 2/1987 | Fed. Rep. of Germany | . |
| 3526183 | 2/1987 | Fed. Rep. of Germany | . |
| 54-24455 | 2/1979 | Japan | 210/616 |
| 54-156349 | 10/1979 | Japan | 210/151 |
| 57-122997 | 7/1982 | Japan | 210/617 |
| 60-197295 | 10/1985 | Japan | 210/617 |

*Primary Examiner*—Benoit Castel
*Attorney, Agent, or Firm*—Gene Harsh; Joseph C. Gil

[57] ABSTRACT

The present invention is directed to an improved process for the biological treatment of an aqueous, waste-containing liquid by the removal of organic matter by microorganisms wherein a carrier material for said microorganisms is added to said liquid and wherein said carrier material comprises a filler-containing, hydrophilic, open-celled polymer in the form of separate individual particles, the improvement wherein said polymer particles, when saturated with water and charged with at least 70 volume-% of biomass formed in the course of the process, have an average density of slightly below the density of said liquid and thereby are suspended in the upper two-thirds of said liquid.

2 Claims, No Drawings

POLYMER CARRIER MASSES AS CARRIERS IN BIOCHEMICAL CONVERSION PROCESSES IN THE AQUEOUS PHASE

BACKGROUND OF THE INVENTION

The present invention relates to the use of hydrophilic, open-celled polymer carrier masses which float in water as carriers in biochemical conversion processes and in particular in the biochemical purification of effluent.

The use of inorganic or organic carrier materials for biological conversion processes, in particular for the biological purification of effluent, is known. Typical of the carrier materials used are those described in U.S. Pat. Nos. 4,576,718 (corresponding to German Offenlegungsschrift No. 3,402,697), and 4,608,397 (corresponding to German Offenlegungsschrift No. 3,402,698), and U.S. application Ser. No. 672,439, filed Nov. 16, 1984 (corresponding to German Offenlegungsschrift No. 3,402,696), U.S. application Ser. No. 884,681, filed July 11, 1986 (corresponding to German Offenlegungsschrift No. 3,526,185), and U.S. application Ser. No. 887,017, filed July 18, 1986 (corresponding to German Offenlegungsschrift No. 3,526,184), and U.S. application Ser. No. 886,853, filed July 18, 1986 (corresponding to German Offenlegungsschrift No. 3,526,183, the disclosures of which are herein incorporated by reference. Typically, in these processes, biological purification of effluent is carried out in activated sludge tanks or bioreactors in the form of towers containing the carriers as solid, fluid or fluidized beds in the form of suspensions which tend to sedimentation (i.e., tend to settle to the bottom of the tank).

DESCRIPTION OF THE INVENTION

It has now surprisingly been found that the use of carrier masses which when saturated with water and charged with biomass have an average density slightly below the density of the aqueous medium and therefore float towards the surface in the aqueous medium have numerous remarkable advantages for the biological purification of effluent.

The amount of energy required for eliminating differences in concentration in the reactor is considerably less than that required when using carrier materials which have a tendency to sediment.

Compared with the previously known, sedimenting carrier materials, the carrier materials used according to the invention, which have a lower specific gravity, have the advantage of producing the same effect in much smaller quantities.

The present invention thus relates to the use of filler-containing hydrophilic, open-celled polymer carrier masses which float in water as carriers for aerobic, anoxic or anaerobic biochemical conversion processes in the aqueous phase, characterized in that the polymer carrier masses used are composed of separate individual particles which when saturated with water and charged with biomass at least 70 volume-% of the carrier have a slightly lower density than the aqueous medium.

More particularly, the present invention is directed to the biological treatment of an aqueous, waste-containing liquid by the removal of organic matter by microorganisms wherein a carrier material for said microorganism is added to said liquid and wherein said carrier material comprises a filler-containing, hydrophilic, open-celled polymer in the form of separate individual particles, the improvement wherein said polymer particles, when saturated with water and charged with biomass at least 70 volume-% of the carrier formed in the course of the process, have an average density of slightly below the density of said liquid and thereby are suspended in the upper two-thirds of said liquid.

The filler content of the polymer carrier materials is 3–60% by weight, preferably 5–50% and particular preferred 10–30% by weight, based on dry substance of the carrier.

The carrier materials to be used according to the invention are substantially similar in their chemical composition to the previously known, sedimenting carrier masses. This means that carrier masses based on polymers and/or polycondensates and/or polyaddition products may be used as carrier masses according to the invention. The preparation of such carrier masses is described, for example, in the above-identified references.

The preparation of carrier masses to be used in the process according to the invention is completely analogous to the methods of preparation given in the above literature references. The density of the carrier materials generally described in these references and used for effluent purification is such that when saturated with water and charged with biomass the materials tend to sediment in the effluent which is required to be purified. Although the carrier masses to be used in the process according to the invention are substantially similar in their chemical composition to the sedimenting carrier masses, the nature and quantities of the components used when they are prepared by methods analogous to those described in the literature references are chosen so that the materials will have the property of floating in the aqueous medium. By "floating" is meant that when the carrier materials are saturated with water and charged with biomass to a "degree of filling" of 50 volume-%, preferably at least 80 volume-% and most preferably 90 to 100 volume-% of the carrier material are suspended in the upper two-thirds of the aqueous phase. This also means that only quite insignificant proportions of the carrier materials, i.e. up to 10%, and preferably not more than 2%, project above the surface of the aqueous medium. Within this definition, the carrier masses generally float when the individual particles, saturated with water and charged with biomass to a degree of at least 70 volume-%, are slightly less dense than the aqueous medium.

The term "degree of filling" used in this context means the proportion by volume in percent of the reactor filled with aqueous medium which is taken up by the carrier material which is charged with biomass and saturated with water.

The carrier masses to be used according to the invention are thus highly water-absorbent, porous polymer carrier masses which float and which contain preferably hydrophilic fillers in a bound form and are stable even when left for years in water and in particular in biological clearing tanks.

The binders used for the fillers may be polymers which are coagulated in the form of their aqueous dispersions and/or polyurethane (ureas) masses which are preferably used as polyisocyanate prepolymers, optionally as aqueous emulsions or aqueous polyurethane dispersions, and perform a matrix function for the fillers. Low molecular weight polyisocyanates may be used as modifying components for the aqueous polymer dispersions and increase the binding power of the polymer matrix. The polymers may be of a non-ionic, hydrophilic nature and/or they may contain anionic and/or cationic groups built into the macromolecule or they may be present as mixtures with suitable external emulsifiers or they may be to a large extent hydrophobic, provided the hydrophilic character of the carrier masses is ensured by means of suitable hydrophilic fillers. The carriers used in biological purification of effluent are in many cases ionic, in particular cationic polymer carriers.

As described in the above-noted references, the choice of fillers which should be inert to microorganisms, is of great importance with regard to the water absorption capacity and adsorption capacity of constituents dissolved in the effluent and with regard to the formation of large surfaces and hence of cavities and protective spaces for colonization by biomasses. The particularly preferred fillers are polyurethane foams which may be added in a size reduced, particulate form, especially flexible polyether-polyurethane block foam having an average particle size below 30 mm, preferably below 20 mm and most preferably 3 to 15 mm, which are available in large quantities as granular waster material. Semi-rigid or rigid polyurethane foams are only used in powder form. The hydrophilic character of the carrier masses is ensured in particular by the use of hydrophilic (e.g. ionic) binders and/or the addition of hydrophilic fillers (e.g. lignite dust, peat or magnetite). Examples of suitable fillers and binders may also be found in the above-mentioned literature references.

In their anhydrous state, the carrier materials to be used in the process according to the invention have a density below 0.3 g/cm$^3$, preferably below 0.2 g/cm$^3$ and most preferably below 0.1 g/cm$^3$. These carrier materials are used in the form of separate individual particles, generally with an average particle diameter below 10 cm, preferably below 5 cm and most preferably from 0.3 to 2.5 cm.

Due to their very hydrophilic character, the carrier materials to be used according to the invention swell on contact with water until completely saturated with water. As a result of this water absorption and of becoming charged with biomass shortly after onset of the clarifying process, they rapidly acquire an average density only slightly below the density of the aqueous medium.

The purification of effluent for which the present invention is intended is generally carried out in activating tanks or effluent towers which are charged with the carrier materials used according to the invention in amounts corresponding to a "degree of filling" of from 5 to 65 volume-%, preferably 10 to 50 and in particular 10 to 30 volume-% of the total volume of the aqueous phase.

When the carrier materials are used according to the invention for the purification of effluent, the effluent to be purified is preferably introduced continuously into the upper region of the tank or tower while the purified effluent is continuously removed from the lower region of the tank or tower. It would be possible in principle to introduce the impure effluent into the lower region and remove the purified effluent from the upper region of the tank or tower. In that case, however, it would be necessary to take care that the carrier materials which are then concentrated where the purified element is discharged are not carried away.

The invention is further illustrated but is not intended to be limited by the following examples in which all parts and percentages are by weight unless otherwise specified.

EXAMPLES (A) Preparation of a polymer carrier mass

70 Parts by weight of a hydrophobic polyether-polyurethane foam having a density of 0.025 g/cm$^3$ cut into cubes having the dimensions 12 mm×12 mm×12 mm; 21.5 parts by weight of inactive, dried lignite dust having an average particle size below 100 μm and a residual moisture content of 7% by weight; 10.0 parts by weight of the cationic isocyanate prepolymer KO-PP-E of U.S. application Ser. No. 672,439, Table 1, having an isocyanate content of 5.9% by weight; 50 parts by weight of water (temperature: 50° C.).

The above mentioned starting materials are mixed in a twin paddle screw trough as described in U.S. application Ser. No. 672,439, Method A3, and after a dwell time of 7 minutes at a product temperature of 45° C. they are discharged into a funnel through an opening at the bottom of the end of the trough and transferred to a filling vessel by compressed air by way of a cyclone. The end product is in the form of cubes and is hydrophilic so that it is immediately wetted by water. Since it is slightly less dense than water, it floats in water without projecting from the surface.

When suspended in water, the filled polymer carrier material has a dry substance content of 19 kg per m$^3$ of suspension. The water content in and between the open cells and cubes of polymer carrier amounts to 98.1%. When removed from the water, the carrier material has the following bulk densities (kg/m$^3$):

When left to drip for 10 minutes: 308
When water is squeezed out (3 bar): 55 (until no water drops out.)
When dried at 100° C. (20 hours, vacuum) 20

(B) Use according to the invention

For the continuous anaerobic biological purification of effluent containing difficultly degradable impurities from a chlorine bleach of a sulphite cellulose factory.

The apparatus used was a cylindrical glass vessel having a capacity of 100 liters and a ratio of diameter to height of 1:2. Effluent was continuously introduced from a perforated, annular pipe in the upper part and discharged from the lower part of the bioreactor. A communicating pipe was attached to the discharge device which was fitted with a perforated diaphragm so that the water level in the vessel could be adjusted to 3 cm above the inflow.

The polyurethane carrier material described above was introduced into the bioreactor. The degree of filling in the aqueous suspension was 25 volume-%.

The effluent, which had a degree of impurity corresponding to a CSB value (chemical oxygen requirement) of 4265 mg/l, developed biomass within 5 weeks and an average dwell time of 3 days in the continuous flow reactor. The microorganisms settled in the form of a fur-like substance almost exclusively on the carrier material and in the internal cellular spaces thereof. The biogas produced, which consisted mainly of methane, was free to escape, unobstructed by the carrier material, and was discharged through a pipe at the top of the reactor.

In the sixth week, the average value, measured on three different days, for elimination of the chemical oxygen requirement (CSB value) was 90%. In addition, the purified effluent discharged was considerably clearer. The carrier material colonized by biomass was completely confined to the upper third of the bioreactor.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In the biological treatment of an aqueous, waste-containing liquid by the removal of organic matter by microorganisms wherein a carrier material for said microorganisms is added to said liquid and wherein said carrier material comprises a filler-containing, hydrophilic, open-celled polymer in the form of separate individual particles, the improvement which comprises: continuously introducing the liquid to be treated into the upper region of a container filled with water and the carrier material, and continuously removing the treated liquid from the lower region of the container, wherein said polymer particles, contain from 3 to 60% by weight of fillers based on the dry weight of carrier material, wherein said carrier material has a density below 0.3 $g/cm^3$ in the anhydrous state, and when saturated with water and charged with biomass at least 70 volume-% of the carrier material have an average density of slightly below the density of said liquid and thereby are suspended in the upper two-thirds of said liquid.

2. The process of claim 1, wherein said carrier material comprises a hydrophilic polyurethane charged with fillers which are inert towards microorganisms.

* * * * *